(12) United States Patent
Hilley

(10) Patent No.: US 6,178,850 B1
(45) Date of Patent: Jan. 30, 2001

(54) BICYCLE PEDAL

(76) Inventor: James Keith Hilley, 2100 Mount Vernon Dr., Boaz, AL (US) 35957

(*) Notice: Under 35 U.S.C. 154(b), the term of this patent shall be extended for 0 days.

(21) Appl. No.: 09/321,166

(22) Filed: May 27, 1999

(51) Int. Cl.[7] .................................................. B62M 3/08
(52) U.S. Cl. ............................................................ 74/594.4
(58) Field of Search ........................... 74/594.4, 594.6, 74/560, 545; D12/125

(56) References Cited

U.S. PATENT DOCUMENTS

| D. 102,378 | * | 12/1936 | Kraeft | D12/125 |
| 3,943,797 | * | 3/1976 | Jollie | 74/594.4 |

FOREIGN PATENT DOCUMENTS

| 368389 | * | 5/1963 | (CH) | 74/594.4 |
| 1685 | * | of 1893 | (GB) | 74/594.6 |
| 1827 | * | of 1898 | (GB) | 74/594.4 |
| 261311 | * | 11/1926 | (GB) | 74/594.4 |

* cited by examiner

*Primary Examiner*—Mary Ann Green

(57) ABSTRACT

A bicycle pedal for permitting a user wearing in-line skates to pedal a bicycle. The bicycle pedal includes a crank with a generally cylindrical rod rotatably coupled to one end of the crank. A sleeve with alternating grooves and ridges is disposed around the rod. An in-line skate is rotatably mounted to an end of the rod opposite the end of the rod coupled to the crank.

12 Claims, 3 Drawing Sheets

BICYCLE PEDAL

BACKGROUND OF THE INVENTION

1. Field of the Invention

The present invention relates to pedal structures for pedaled vehicles such as bicycles and the like and more particularly pertains to a new bicycle pedal for permitting a user wearing in-line skates to pedal a bicycle.

2. Description of the Prior Art

The use of pedal structures for pedaled vehicles such as bicycles and the like is known in the prior art. More specifically, pedal structures for pedaled vehicles such as bicycles and the like heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,377,561 by Danieli et al.; U.S. Pat. No. 598,325 by McIntyre; EPO Patent No. EP 0 664 252 A1 by Dc Schrijver; U.S. Pat. No. 5,284,066 by Weiss; EPO Patent No. EP 0 718 183 A1 by Di Blasi; U.S. Pat. No. 3,302,483 by Golden et al.; and U.S. Pat. No. 4,004,468 by Durham.

While these devices fulfill their respective, particular objectives and requirements, the aforementioned patents do not disclose a new bicycle pedal. The inventive device includes a crank with a generally cylindrical rod rotatably coupled to one end of the crank. A sleeve with alternating grooves and ridges is disposed around the rod. An in-line skate is rotatably mounted to an end of the rod opposite the end of the rod coupled to the crank.

In these respects, the bicycle pedal according to the present invention substantially departs from the conventional concepts and designs of the prior art, and in so doing provides an apparatus primarily developed for the purpose of permitting a user wearing in-line skates to pedal a bicycle.

SUMMARY OF THE INVENTION

In view of the foregoing disadvantages inherent in the known types of pedal structures for pedaled vehicles such as bicycles and the like now present in the prior art, the present invention provides a new bicycle pedal construction wherein the same can be utilized for permitting a user wearing in-line skates to pedal a bicycle.

The general purpose of the present invention, which will be described subsequently in greater detail, is to provide a new bicycle pedal apparatus and method which has many of the advantages of the pedal structures for pedaled vehicles such as bicycles and the like mentioned heretofore and many novel features that result in a new bicycle pedal which is not anticipated, rendered obvious, suggested, or even implied by any of the prior art pedal structures for pedaled vehicles such as bicycles and the like, either alone or in any combination thereof.

To attain this, the present invention generally comprises a crank with a generally cylindrical rod rotatably coupled to one end of the crank. A sleeve with alternating grooves and ridges is disposed around the rod. An in-line skate is rotatably mounted to an end of the rod opposite the end of the rod coupled to the crank.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bicycle pedal apparatus and method which has many of the advantages of the pedal structures for pedaled vehicles such as bicycles and the like mentioned heretofore and many novel features that result in a new bicycle pedal which is not anticipated, rendered obvious, suggested, or even implied by any of the prior art pedal structures for pedaled vehicles such as bicycles and the like, either alone or in any combination thereof.

It is another object of the present invention to provide a new bicycle pedal which may be easily and efficiently manufactured and marketed.

It is a further object of the present invention to provide a new bicycle pedal which is of a durable and reliable construction.

An even further object of the present invention is to provide a new bicycle pedal which is susceptible of a low cost of manufacture with regard to both materials and labor, and which accordingly is then susceptible of low prices of sale to the consuming public, thereby making such bicycle pedal economically available to the buying public.

Still yet another object of the present invention is to provide a new bicycle pedal which provides in the apparatuses and methods of the prior art some of the advantages thereof, while simultaneously overcoming some of the disadvantages normally associated therewith.

Still another object of the present invention is to provide a new bicycle pedal for permitting a user wearing in-line skates to pedal a bicycle.

Yet another object of the present invention is to provide a new bicycle pedal which includes a crank with a generally cylindrical rod rotatably coupled to one end of the crank. A sleeve with alternating grooves and ridges is disposed around the rod. An in-line skate is rotatably mounted to an end of the rod opposite the end of the rod coupled to the crank.

Still yet another object of the present invention is to provide a new bicycle pedal that eliminates the need for users to remove their in-line skates before riding a bicycle.

Even still another object of the present invention is to provide a new bicycle pedal that lets a user wearing in-line skates to have better control when engaging the pedal with their in-line skates than with tradition bicycle pedals.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
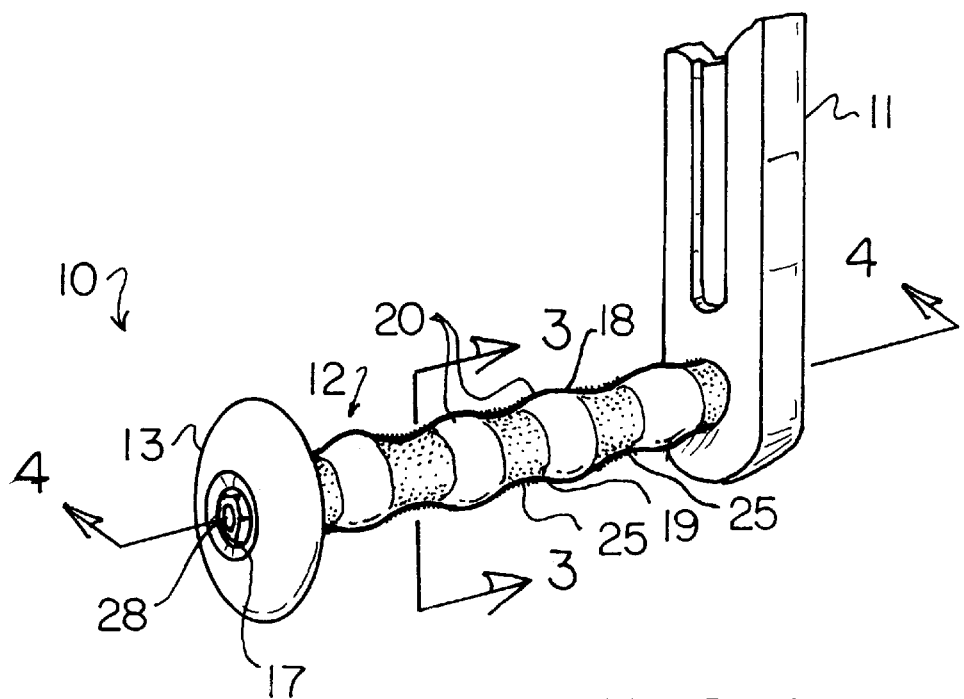
FIG. 1 is a schematic perspective view of a new bicycle pedal according to the present invention.

With reference now to the drawings, and in particular to FIGS. 1 through 4 thereof, a new bicycle pedal embodying the principles and concepts of the present invention and generally designated by the reference numeral 10 will be described.

As best illustrated in FIGS. 1 through 4, the bicycle pedal 10 generally comprises a crank with a generally cylindrical rod rotatably coupled to one end of the crank. A sleeve with alternating grooves and ridges is disposed around the rod. An in-line skate is rotatably mounted to an end of the rod opposite the end of the rod coupled to the crank.

In use, the bicycle pedal is designed for use on a pedal-driven vehicle such as a bicycle and the like by a user wearing in-line skates. In closer detail, the structure of the bicycle pedal 10 comprises an elongate crank 11 with a pair of opposite ends and a longitudinal axis extending between the ends of the crank. One end of the crank is designed for mounting to a chain ring of a bicycle such that the chain ring may be rotated by the crank.

The structure also includes an elongate rod 12 having a pair of opposite ends and a longitudinal axis extending between the ends of the rod. The rod is preferably generally cylindrical and has a generally circular transverse cross section taken substantially perpendicular to the longitudinal axis of the rod. A first of the ends of the rod is rotatably coupled to the other end of the crank opposite the end mounted to the chain ring to permit free rotation of the rod about the longitudinal axis of the rod. Preferably, the longitudinal axis of the rod is extended substantially perpendicular to the longitudinal axis of the crank. The rod has a length defined between the ends of the rod and an outer diameter defined substantially perpendicular to the longitudinal axis of the rod. Preferably, the length of the rod is about ten times the outer diameter of the rod. In an ideal illustrative embodiment, the length of the rod is about 5 ½ inches and the outer diameter of the rod is about 12 inch.

An in-line skate wheel 13 designed for mounting to an in-line skate is preferably rotatably and detachably mounted to a second of the ends of the to permit free rotation of the in-line skate wheel about an axis coaxial with the longitudinal axis of the rod and to permit detachment of the in-line skate wheel from the second end of the rod.

Figure 4:
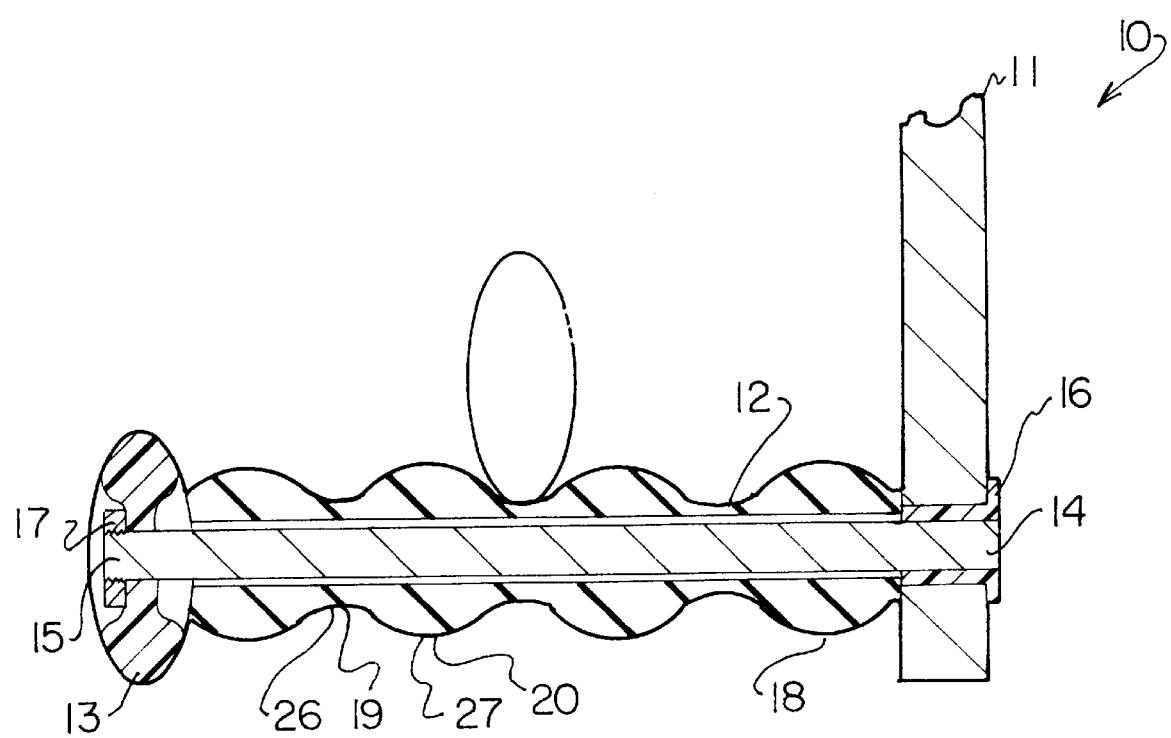
FIG. 4 is a schematic longitudinal cross sectional view of the present invention taken along line 4—4 of FIG. 1.

Ideally, the ends of the rod each have an extent 14,15 outwardly extending therefrom. As best illustrated in FIG. 4, the extent of the first end of the rod is extended through the crank and secured to the crank by a fastener 16 to rotatably couple the first end of the rod to the crank. The extent of the second end of the rod is extended through the center of the in-line skate wheel and has a fastener 17 disposed thereon to hold the in-line skate wheel to the second end of the rod.

A resiliently deformable rubber or plastic sleeve 18 is disposed around the rod so that the sleeve is positioned on the rod between the in-line skate wheel and the crank to substantially cover the rod. The sleeve has a pair of opposite ends and a longitudinal axis extending between the ends of the rod. One of the ends of the sleeve is positioned adjacent one of the ends of the rod. The other of the ends of the sleeve is positioned adjacent the other of the ends of the rod. Preferably, the longitudinal axes of the rod and sleeve are generally coaxial with one another.

Figure 2:
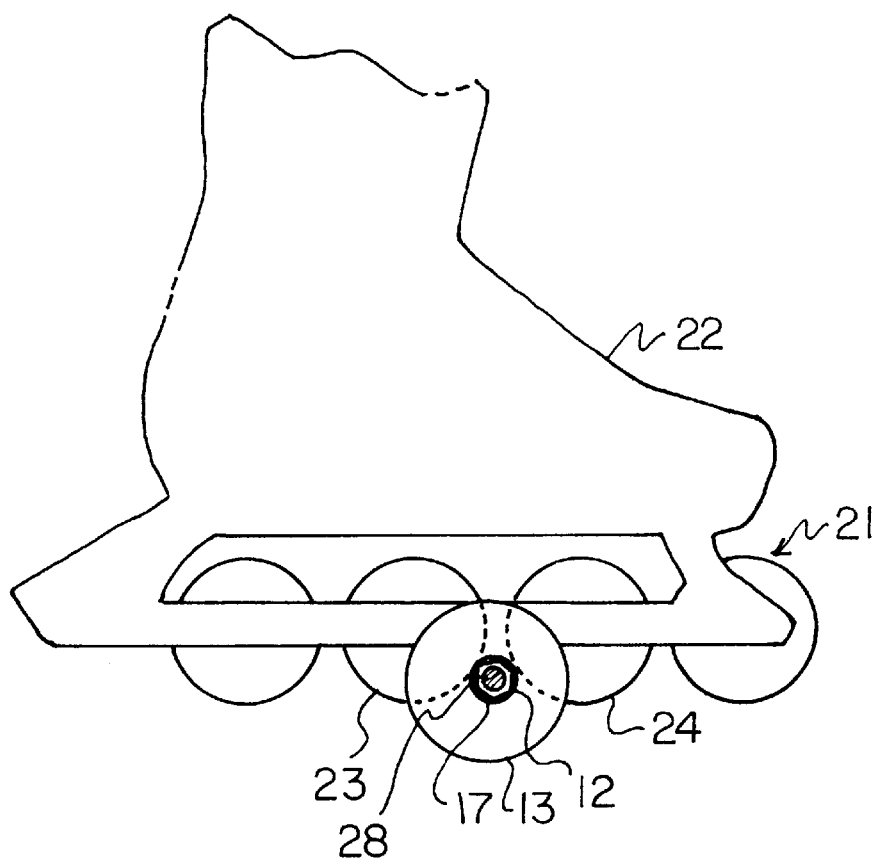
FIG. 2 is a schematic side view of the present invention illustrating the positioning of the wheels portion of an in-line skate engaging the pedal.

The sleeve has an plurality of alternating annular grooves 19 and annular ridges 20 therearound arranged in a row extending between the ends of the sleeve. Preferably, the row of grooves and ridges terminates at a groove at both ends of the sleeve as best shown in FIG. 4. In use, as best represented in FIGS. 2 and 4, each of the grooves of the sleeve is designed for resting a wheels portion 21 of an in-line skate 22 thereon such that the groove in positioned in a gap formed between a pair of adjacent wheels 23,24 of the in-line skate so that each of the adjacent wheels engages a portion of the sleeve in the groove.

In an optimal embodiment, each of the grooves of the sleeve has therearound a roughened surface 25 with respect to a relatively smooth surface for frictionally enhancing contact between the sleeve and the wheels of an in-line skate in contact with a groove of the sleeve.

Figure 3:
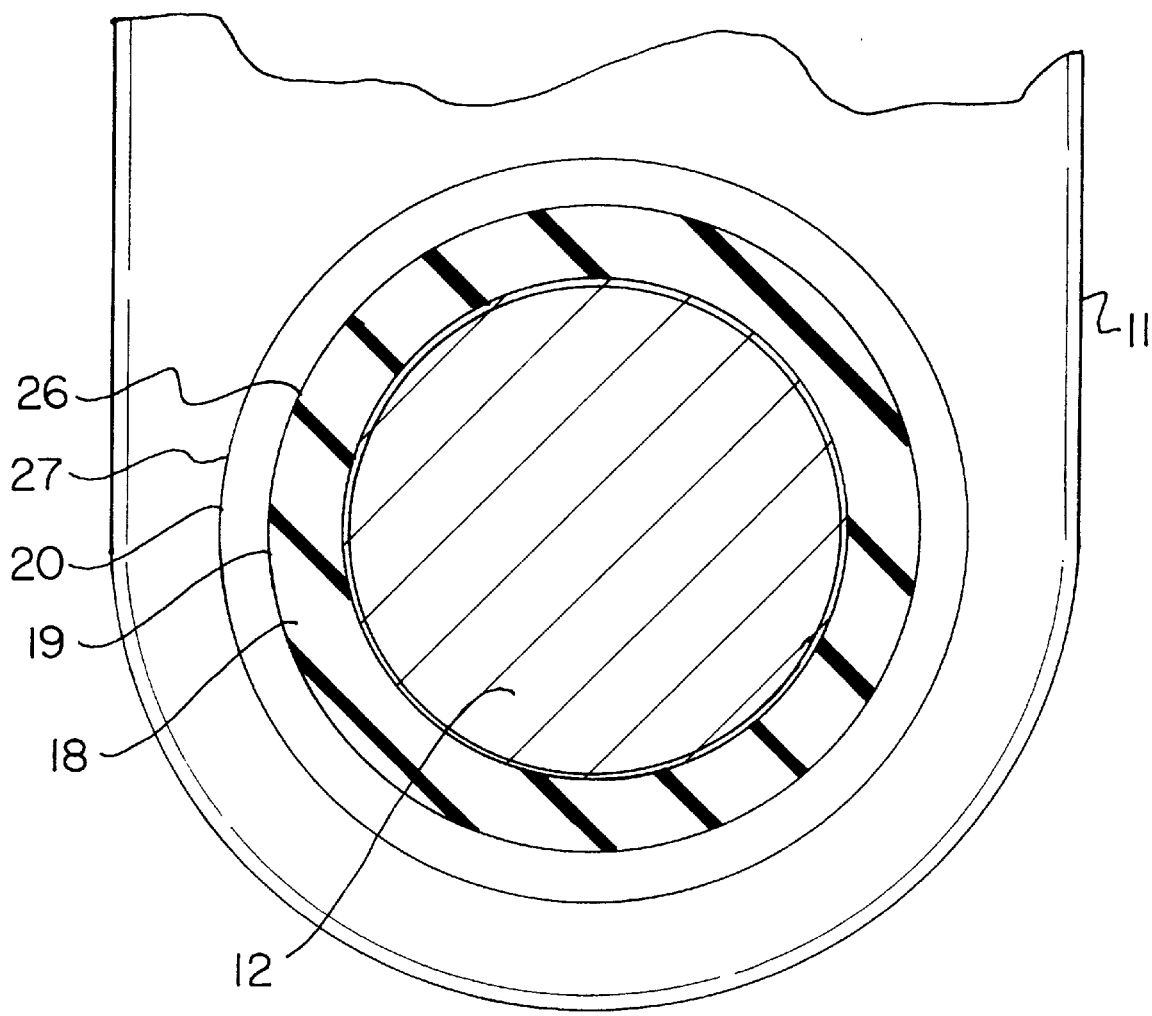
FIG. 3 is a schematic transverse cross sectional view of the present invention taken from line 3—3 of FIG. 1.

As best illustrated in FIG. 3, each of the grooves of the sleeve has an annular nadir 26 at a point on each groove closest to the longitudinal axis of the sleeve while each of the ridges of the sleeve has an annular apex 27 at a point of each ridge furthest away from the longitudinal axis of the sleeve. Each nadir and apex of adjacent grooves and sleeves defines a groove depth therebetween. In an ideal illustrative embodiment, each groove depth is about ³⁄₁₆ inch.

The sleeve has a thickness defined radially outwards from the longitudinal axis of the sleeve. Preferably, the thickness of the sleeve at each of the grooves of the sleeve is less than the thickness of the sleeve at each of the ridges. In an ideal illustrative embodiment, the thickness of the sleeve at each groove is about ³⁄₁₆ inch and the thickness of the sleeve at each ridge is about ⅜ inch.

Optionally, in one embodiment of the invention, the second end of the rod may have a reflector 28 with a light reflective surface (such as the type commonly found on bicycles) for reflecting light to further enhance the visibility of a rider. In another option, this reflector may be provided on an outer face of the fastener 17 instead of on the second end or in addition with the second end.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pedal structure, comprising:
   a crank having a pair of opposite ends and a longitudinal axis extending between said ends of said crank;
   a rod having a pair of opposite ends and a longitudinal axis extending between said ends of said rod;
   a first of said ends of said rod being rotatably coupled to one of said ends of said crank; and
   an in-line skate wheel being rotatably and detachably mounted to a second of said ends of said rod.

2. The pedal structure of claim 1, wherein said rod is generally cylindrical and has a generally circular transverse cross section taken substantially perpendicular to said longitudinal axis of said rod.

3. The pedal structure of claim 1, wherein said longitudinal axis of said rod is extended substantially perpendicular to said longitudinal axis of said crank.

4. The pedal structure of claim 1, further comprising a sleeve being disposed around said rod to substantially cover said rod.

5. The pedal structure of claim 4, wherein said sleeve comprises a resiliently deformable material.

6. The pedal structure of claim 4, wherein said sleeve has a plurality of alternating annular grooves and annular ridges therearound.

7. The pedal structure of claim 6, wherein said grooves and ridges of said sleeve are arranged in a row extending between said ends of said rod, said row of grooves and ridges terminating at a groove adjacent both ends of said rod.

8. The pedal structure of claim 6, wherein each of said grooves of said sleeve has therearound a striated surface for frictionally enhancing contact between said sleeve and the wheels of an in-line skate in contact with one of said grooves of said sleeve.

9. A pedal structure, comprising:
   a crank having a pair of opposite ends and a longitudinal axis extending between said ends of said crank;
   an elongate generally cylindrical rod having a pair of opposite ends and a longitudinal axis extending between said ends of said rod, said rod having a generally circular transverse cross section taken substantially perpendicular to said longitudinal axis of said rod;
   a first of said ends of said rod being rotatably coupled to one of said ends of said crank to permit free rotation of said rod about said longitudinal axis of said rod;
   said longitudinal axis of said rod being extended substantially perpendicular to said longitudinal axis of said crank;
   said rod having a length defined between said ends of said rod and an outer diameter defined substantially perpendicular to said longitudinal axis of said rod;
   wherein said length of said rod is about ten times said outer diameter of said rod;
   an in-line skate wheel adapted for mounting to an in-line skate, said in-line skate wheel being rotatably and detachably mounted to a second of said ends of said rod to permit free rotation of said in-line skate wheel about an axis coaxial with said longitudinal axis of said rod and to permit detachment of said in-line skate wheel from said second end of said rod;
   a resiliently deformable sleeve being disposed around said rod to substantially cover said rod;
   said sleeve having a pair of opposite ends and a longitudinal axis extending between said ends of said rod, one of said ends of said sleeve being positioned adjacent one of said ends of said rod, the other of said ends of said sleeve being positioned adjacent the other of said ends of said rod;
   said longitudinal axes of said rod and sleeve being generally coaxial with one another;
   said sleeve having a plurality of alternating annular grooves and annular ridges therearound arranged in a row extending between said ends of said sleeve, said row of grooves and ridges terminating at a groove at both ends of said sleeve;
   each of said grooves of said sleeve being adapted for resting a wheels portion of an in-line skate thereon such that said groove is positioned in a gap formed between a pair of adjacent wheels of the in-line skate so that each of the adjacent wheels engages a portion of said sleeve; and
   each of said grooves of said sleeve having therearound a striated surface for frictionally enhancing contact between said sleeve and the wheels of an in-line skate in contact with one of said grooves of said sleeve.

10. A pedal structure for mounting on a crank having a pair of opposite ends and a longitudinal axis extending between said opposite ends of said crank, said pedal structure comprising:
    a rod having a pair of opposite ends and a longitudinal axis extending between said ends of said rod;
    a first of said ends of said rod being rotatably coupled to one of said ends of said crank; and
    an in-line skate wheel being rotatably and detachably mounted to a second of said ends of said rod.

11. The pedal structure of claim 10, further comprising sleeve having a plurality of alternating annular grooves and annular ridges formed on an exterior surface of said sleeve, each of said grooves and ridges having, an arcuate surface along a length direction of said sleeve, wherein a radius of curvature of the arcuate surface of each of said ridges is approximately equal to a radius of curvature of the arcuate surface of each of said grooves such that each of said annular grooves is postionable between wheels of an in-line skate.

12. The pedal structure of claim 11, wherein each of said grooves of said sleeve has a striated surface for frictionally enhancing contact between said sleeve and the wheels of an in-line skate in contact with one of said groves of said sleeve.

* * * * *